United States Patent

[11] 3,619,759

[72] Inventor Nagataka Seki
Tokyo, Japan
[21] Appl. No. 76,194
[22] Filed Sept. 28, 1970
[45] Patented Nov. 9, 1971
[73] Assignee Tokyo Shibaura Electric Co., Ltd.
Kawasaki-shi, Japan
[32] Priority Sept. 29, 1969
[33] Japan
[31] 44/77053

[54] INVERTER DEVICE
6 Claims, 7 Drawing Figs.
[52] U.S. Cl. .................................................. 321/45 C, 321/45 ER
[51] Int. Cl. ............................................... H02m 7/52
[50] Field of Search .......................................... 321/5, 45 R, 45 C, 45 ER

[56] References Cited
UNITED STATES PATENTS

| | | | |
|---|---|---|---|
| 3,349,315 | 10/1967 | Studtmann .................. | 321/45 ER |
| 3,405,346 | 10/1968 | Krauthamer .................. | 321/45 C |
| 3,465,233 | 9/1969 | Johnston et al. .............. | 321/45 C |
| 3,474,320 | 10/1969 | Chandler ...................... | 321/45 C |
| 3,559,038 | 1/1971 | Krauthamer .................. | 321/45 C |

FOREIGN PATENTS

| 200,462 | 12/1965 | Sweden ...................... | 321/45 R |

*Primary Examiner*—William H. Beha, Jr.
*Attorney*—Oblon, Fisher & Spivak

ABSTRACT: A bridge type inverter which has two arms connected in series across a DC power supply. Each of the arms respectively includes first and second thyristor units which are serially connected with the same polarities. A load is provided and is connected between a common connecting point of the arms and an electrically neutral point. The second thyristor units of the two arms are located at positions adjacent to the common connecting point of the two arms and are respectively provided with first and second commutation circuits which are electromagnetically coupled to each other. When it is desired to turn off a presently turned on arm, it is necessary to turn on only the second thyristor unit of the other off arm. At such time, commutation current will flow from the second commutation circuit through the second thyristor unit of the off arm. Commutation current will thereby be induced in the first commutation circuit to turn off the arm which was turned on. In a similar manner the other arm when conducting can be turned off.

PATENTED NOV 9 1971 3,619,759

INVENTOR
NAGATAKA SEKI

BY Oblon, Fisher & Spivak.
ATTORNEYS

INVENTOR
NAGATAKI SEKI 3,619,759

INVERTER DEVICE

BACKGROUND OF THE INVENTION

1. Field of the Invention

The present invention generally relates to inverter devices and more particularly to an inverter device for reducing commutation losses and suppressing oscillations which may occur after the completion of every commutation in a commutating circuit.

2. Description Of the Prior Art

In the past bridge type inverter devices have been known to exist which have at least two arms connected in series across a DC voltage supply. The two arms are known to respectively include at least one thyristor and a half winding of a commutating reactor for electromagnetically coupling the arms to each other. Each of the arms is also provided with a commutating capacitor connected in parallel thereacross.

While somewhat satisfactory, one of the problems in the past with inverter devices was that when commutation was made from one arm to the other, the thyristors in both arms had to be simultaneously turned on for an overlap period of time. During this overlap period a short circuit current would flow from the DC voltage supply through the serially connected arms, whereby the commutation efficiency of the inverter was reduced. In order to reduce the amplitude of the short circuit current to a small value, it had been necessary to increase the inductance of the commutating reactor. However, since a load current was normally passed through the reactor, a large voltage drop would occur across the reactor and interfere with the voltage regulation of the inverter.

Moreover, in the prior art inverter devices, an electromagnetic energy was stored in the commutating reactor during the period of time that the load current and the short circuit current would flow therethrough. Such stored energy current could cause undesired oscillations to occur in the commutating circuit, which serially includes a reactor winding and commutating capacitors, after every completion of commutation. Furthermore, as a result thereof, the terminal voltages of the commutating capacitors could be varied in response to the undesired oscillations.

Thus, if commutation was made at a period of time when the capacitor voltage was small then because of the above oscillations, the desired commutation may fail to occur because of an insufficiency in the commutation current. In addition, the undesirable oscillating voltages within the commutating circuit may be added to the output voltage of DC voltage supply and thereby cause an abnormally high voltage to be developed within the inverter circuit, whereby the thyristors and other parts of the inverter may be caused to suffer damage therefrom.

In order to eliminate the above problems, it was found to be necessary to minimize the amplitude of the undesired oscillations to an extremely small value as fast as possible after the completion of a commutation. In attempting to reduce the undesirable oscillations, a tertiary winding was provided on the commutating reactor in order to feed back the stored energy of the reactor to the DC voltage supply of the inverter through an auxiliary blocking diode. While somewhat satisfactory, it was found that with such an arrangement, since the DC voltage supply of the inverter was usually composed of a nonreversible rectifier and a filter condenser that when the inverter load was relatively small the feed back of the energy stored in the reactor would cause the condenser voltage to increase, thereby making it impossible to regulate the output voltage level of the rectifier by the control thereof. Moreover, with such an arrangement, the commutating reactor is extremely large in size and quite expensive.

SUMMARY OF THE INVENTION

Accordingly, it is one object of this invention to provide a new and improved unique inverter device in which the simultaneous conduction of the two arms thereof which are serially connected across a DC voltage supply is eliminated such that any reduction is commutating efficiency is avoided.

Another object of this invention is to provide a new and improved unique inverter device wherein undesirable oscillations which may occur in the commutation circuit after the completion of commutation is eliminated.

A still further object of this invention is to provide a new and improved inverter device wherein no feed back of energy from the inverter circuit to the DC voltage supply thereof will occur.

One other object of this invention is to provide a new and improved unique inverter device which is relatively small in size, compact and inexpensive.

Briefly, in accordance with one aspect of this invention, an inverter device is provided which includes first and second arms serially connected across a DC voltage supply. Each of the arms respectively includes first and second thyristor units connected in series with the same conductive polarities. The second thyristor units are located at positions adjacent to a common connecting point of the arms, and a load is provided and connected between the common connecting point and an electrically neutral point. First and second commutating circuits are provided and the same are respectively connected in parallel with the second thyristor units of first and second arms. Each of the first and second commutating circuits includes a commutating capacitor and the same are electromagnetically coupled to each other by a coupling transformer whose windings are respectively serially connected in the aforesaid commutating circuits. Commutation is effected from the first arm to the second arm, by turning on the second thyristor unit in the second arm which has been in a nonconductive state. This will in turn cause the capacitor to discharge through the second commutation circuit and thereby cause the induced current to flow through the first commutation circuit to turn off the first arm. Commutation from the second arm to the first arm is made in a similar manner.

BRIEF DESCRIPTION OF THE DRAWINGS

A more complete appreciation of the invention will be readily obtained as the same becomes better understood by reference to the following detailed description when considered in connection with the accompanying Drawings, wherein.

DETAILED DESCRIPTION OF THE PREFERRED EMBODIMENTS

Figure 1:
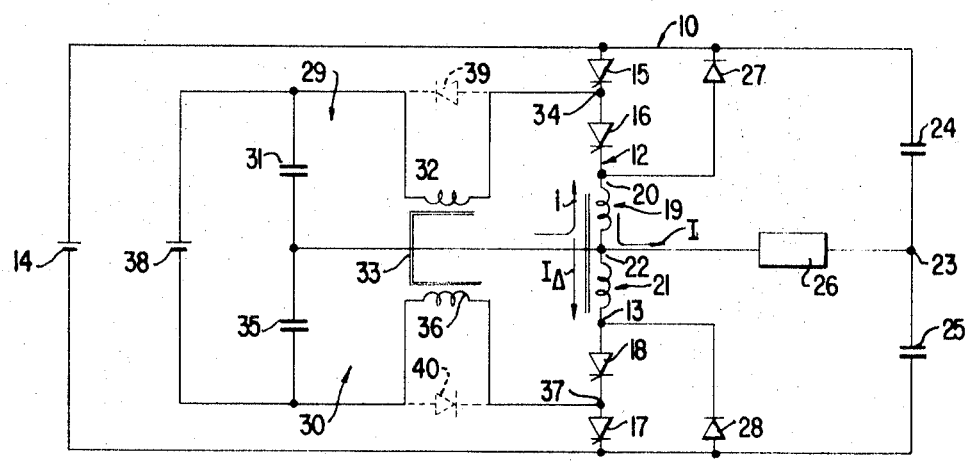
FIG. 1 is a circuit diagram of one embodiment of an inverter device according to the present invention.

Referring now to the Drawings, wherein like reference numerals designate identical or corresponding parts throughout the several views, and more particularly to FIG. 1 thereof, wherein one preferred embodiment of a bridge type single-phase inverter 10 in accordance with this invention is shown as including two arms 12 and 13 which are serially connected across a DC voltage supply 14. The arm 12 includes a first thyristor unit 15 and a second thyristor unit 18 which is connected in series therewith and of the same conductive polarity. A commutating reactor 19 having serially connected half windings 20 and 21 is provided and includes a common connecting point or center tap 22. As shown in the Figure, the commutating reactor 19 is connected between the first and second arms 12 and 13. An electrically neutral point 23 is provided by connecting a pair of serially connected capacitors 24 and 25 across the DC voltage supply 14 with a load 26 connected between the center tap 22 of reactor 19 and the neutral point 23. Additionally, a pair of diodes 27 and 28, the purpose of which is explained hereinafter, are respectively connected across the serially connected thyristors 15, 16 and 17, 18 in a polarity opposite thereto.

In order to effect commutation of the inverter 10, first and second commutating circuits generally designated by the reference numerals 29 and 30 are provided. The first commutating circuit 29 serially includes a commutating capacitor 31 and a primary coil 32 of a coupling transformer 33, such, for example, as a conventional current transformer. The first commutating circuit 29 is connected between an intermediate connecting point 34 of the first and second thyristors 15 and 16 of the first arm 12 and the center tap 22 of reactor 19. Similarly, the second commutating circuit 30 serially includes a commutating capacitor 35 and a secondary coil 36 of the coupling transformer 33. The second commutating circuit 30 is connected between an intermediate connecting point 37 of the first and second thyristors 17 and 18 of the second arm 13 and the center tap 22 of reactor 19.

It should now be understood that both of the commutating circuits 29 and 30 are closely coupled with each other by the electromagnetically coupled primary and secondary coils 32 and 36 of the transformer 33. In order to charge the serially connected commutating capacitors 31 and 35, an auxiliary DC voltage supply 38 is provided and connected thereacross.

In operation, if it is assumed that the first arm 12 is conducting then the load current I will flow from the positive terminal of the DC voltage supply 14 through the first and second thyristors 15 and 16 of the first arm 12, the half winding 20 of the reactor 19, the load 26 and the capacitor 25 to the negative terminal of the DC voltage supply 14. During the period of time that the current will conduct in the arm 12, the first and second thyristors 17 and 18 of the second arm 13 will both be turned off so that no current will flow in the second arm. The capacitor 35 will be charged from the auxiliary DC voltage supply 38 to the voltage level thereof through the winding 32 of transformer 33, the thyristor 16 and the half winding 20 of the reactor 19. On the other hand, the capacitor 31 will not be charged by the voltage supply 38 because the thyristor 16 which is connected in parallel thereacross is turned on.

In order to effect commutation from the first arm 12 to the second arm 13, the second thyristor 18 of the second arm 13 is caused to turn on. The discharging current of the capacitor 35 will then flow through the half winding 21 of the reactor 19, the second thyristor 18 and the secondary coil 36 of transformer 33.

It should be understood that when commutation is effected a current $i$ will be induced in the first commutating circuit 29 through the magnetic coupling between the primary and secondary coils 32 and 36 of the transformer 33. The direction of flow of the current $i$ induced in the circuit 29 is such that it will oppose the conductive polarity of the second thyristor 16 of the first arm 12. The desired polarity is selected from the primary and secondary coils 32 and 36 of the transformer 33.

When both of the thyristors 16 and 18 in the arms 12 and 13 are at the same time in a conductive state, a short circuit current or excitation current I$\Delta$ will be supplied from the auxiliary voltage supply 38 to the reactor 19 through the thyristors 16 and 18. With the present invention, however, it is possible to effectively suppress the amplitude of the excitation current I$\Delta$ by increasing the inductance of the coils 32 and 36 of the transformer 33. Moreover, the increase in inductance of the coils 32 and 36 will not effect or interfere with the voltage regulation of the inverter since they are not located in the arms 12 and 13 wherein the load current passes.

When the induced and oppositely directed current $i$ becomes equal to the sum of the load I and the excitation current I$\Delta$ which flows through the second thyristor 16 of the first arm 12, then the current flowing through the thyristor 16 will become zero. At such time, the current I will begin to flow through the diode 27 and the first thyristor 15 of the first arm 12. It should thus be apparent that during the conduction of the diode 27 the thyristor 16 will become negatively biased and thereby will turn off after a predetermined turnoff time has elapsed. When the amplitude of the forward current flowing through the diode 27 reduces to an amplitude equal to the sum of the load current and the excitation current, then the diode 27 will become nonconductive, and the first thyristor 15 will also turn off.

It should also be understood that the first thyristor 17 of the second arm 13 will be turned on when the forward current of the diode 27 becomes zero. At that time, the load current will be transferred from the first arm 12 to the second arm 13, whereby the same will then flow through the load 26 in a reverse direction.

It should be readily apparent that in operation commutation from the second arm 14 to the first arm 12 will occur in a manner similar to that described above by using the second thyristor 16 of the first arm 12.

In order to suppress any oscillations which may occur in the commutation circuits 29 and 30 after every completed commutation, it is preferable to respectively connect additional diodes 39 and 40, as shown with phantom lines, across the coils 32 and 36, whereby any oscillatory current is effectively absorbed.

It should be understood that the diodes 27 and 28 will also function to pass therethrough any lagging current in the event that the load 26 will take a larger lagging current.

Figure 2:
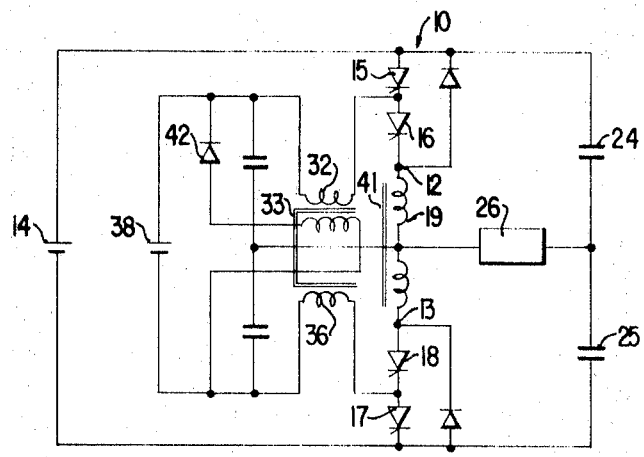
FIGS. 2, 3, 4, 5, and 6, respectively, show alternative embodiments of inverter devices according to the present invention; and, FIG. 7 is a circuit diagram of a three-phase inverter in accordance with the teachings of this invention.

Referring now to FIG. 2, an alternative and preferred embodiment for suppressing oscillations in commutating circuits is shown as having a tertiary coil 41 magnetically coupled with coils 32 and 36 of the transformer 33. The tertiary coil 41 serves to feed back any oscillatory currents in the commutation circuits to the auxiliary voltage supply 38 through a diode 42.

Figure 3:
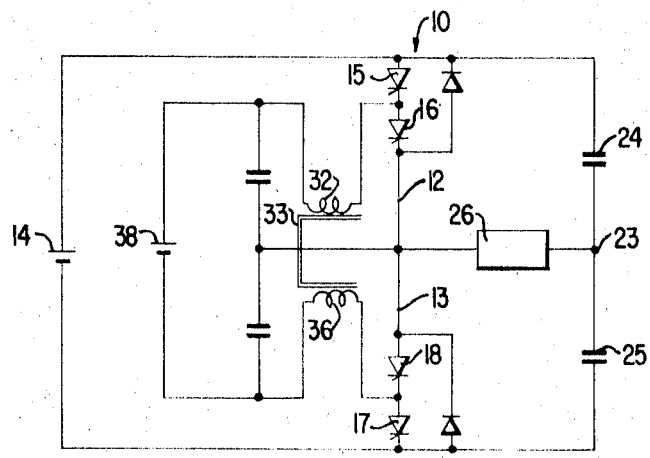

Still another alternative and preferred embodiment of an inverting device according to the present invention is shown with reference to FIG. 3, wherein the commutating reactor 19 of the above-mentioned embodiments of FIGS. 1 and 2 is eliminated. The commutating reactor in those and other embodiments is not employed for the purpose of positively enhancing the commutation of the inverter, but is employed for suppressing the much larger rate of change in turn-on and turnoff currents of the thyristors. For this purpose, a lower inductance in the arms 12 and 13 is allowed. According to the present teaching, however, the leakage inductance of the transformer 33 may be employed to suppress the rate of change of the currents flowing through the arms 12 and 13.

Figure 4:
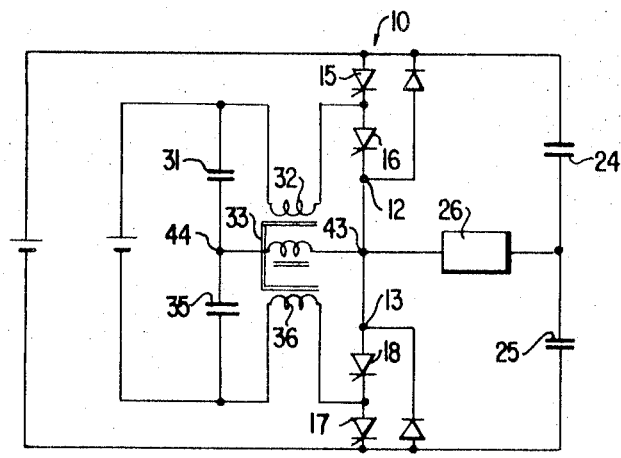

In accordance with another preferred embodiment, FIG. 4 shows a commutating reactor 43 being provided and connected between the common connecting point 44 of the serially connected capacitors 31 and 35 and the common connecting point 22 of the two serially connected arms 12 and 13. The commutating reactor 43 serves to suppress the rate of change of turn-on and turnoff currents of the thyristors.

Figure 5:
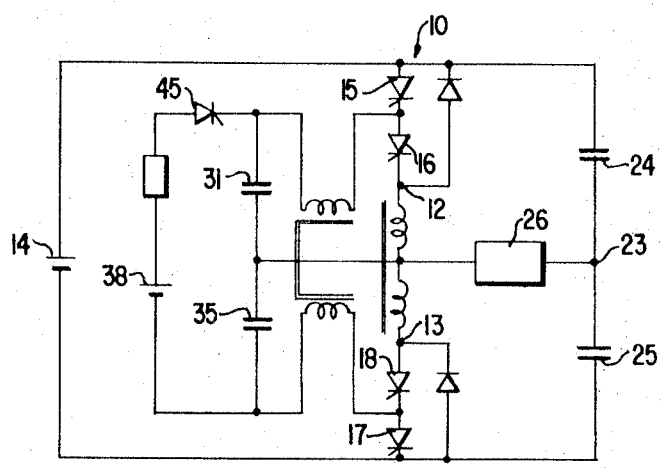

A further alternative and preferred embodiment is shown in FIG. 5, wherein an auxiliary thyristor 45 is provided and connected between the auxiliary voltage supply 38 and the capacitors 31 and 35. The auxiliary thyristor 45 is employed to turn on after the completion of a commutation and to turn off before the beginning of the same such that the excitation current, which may flow through the respective second thyristors 16 and 18 of two arms 12 and 13 and thereby lessen the commutation efficiency of the inverter, is effectively reduced.

Figure 6:
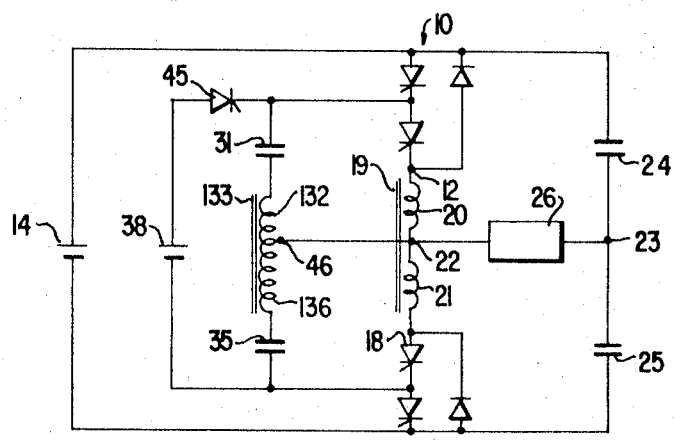

With reference to FIG. 6, still another alternative and preferred embodiment is shown as including a transformer 133 having electromagnetically coupled windings 132 and 136 which are connected between the capacitors 31 and 32. A center tap 46 is provided and is connected to the center tap 22 of the reactor 19. It will be apparent that the function of this embodiment is similar to those previously described.

Figure 7:
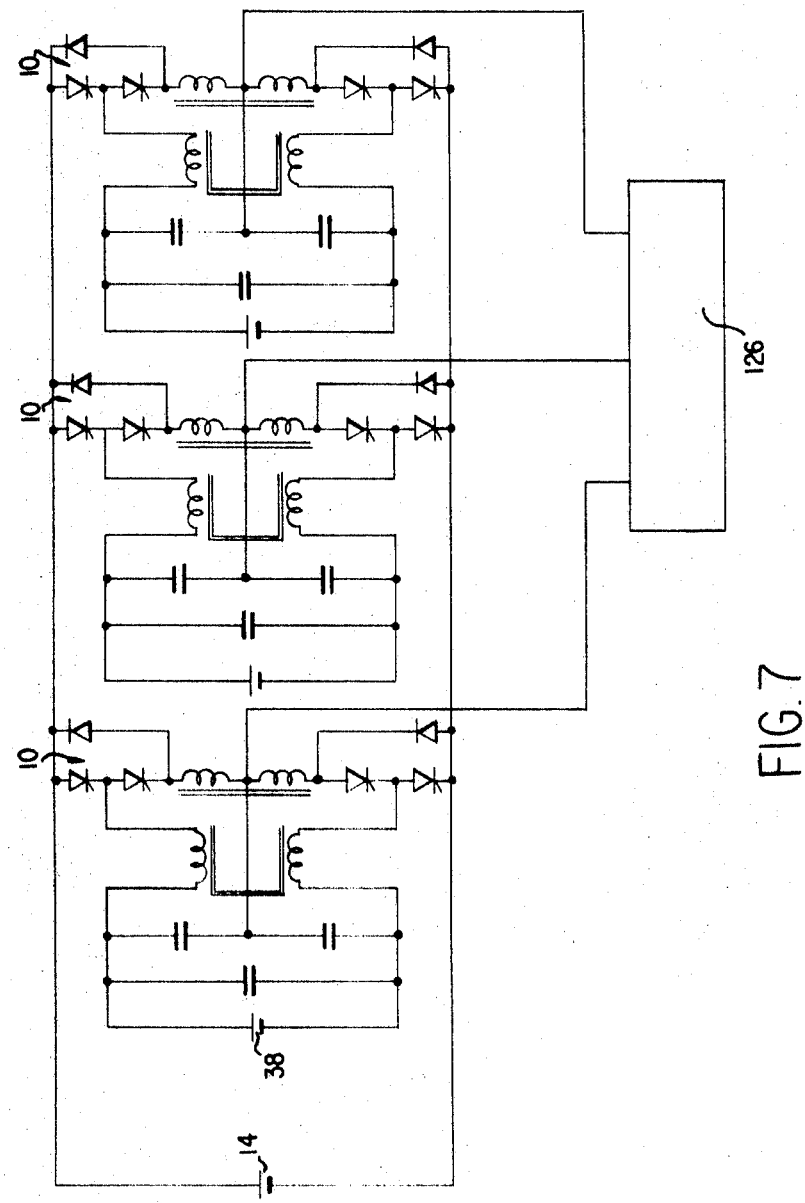

Referring now to FIG. 7, a three-phase inverter for forcing a three-phase load 126 is shown therein. The arrangement of each phase of the inverter is similar to that of FIG. 1, with the exception that the capacitors 24 and 25 for providing the electrically neutral point 23 are eliminated. It should be understood, however, that the electrically neutral point is provided in a three-phase network of the load 126.

It should now be apparent that in accordance with the teachings of the present invention that the two arms of the inverter device which are serially connected across the DC voltage supply will not simultaneously be turned on during the commutation therebetween, since one of the first thyristor units of the two arms will remain in a turnoff or nonconduction state during the commutation. Thus, as a result thereof, a short circuit of the DC voltage supply through the two arms will not occur and commutation losses of the inverter can be effectively reduced. Moreover, it is seen that in the embodiments where the commutating reactor is serially connected between the two arms of the inverter device that the inductance thereof can be reduced to a low enough value to sufficiently suppress the rate of change of turn-on and turnoff currents of the inverter such that the electromagnetic energy being stored therein can be reduced to a low enough level to eliminate any oscillations in the commutating circuit which may occur after the completion of every commutation. In addition, since in the present invention the load current is not passed through the coils of the transformer for magnetically coupling the two commutation circuits, it is possible to increase the inductance of the coupling transformer to eliminate the amplitude of the excitation current without reducing the voltage regulation of the inverter. As such, it thus becomes possible to make the coupling transformer of the present invention of small size and low cost. Still further, since the undesirable oscillations in the commutating circuits are effectively eliminated, abnormally high voltages will not develop in the inverter circuit whereby the parts thereof could be destroyed. Moreover, when the auxiliary DC voltage supply is employed, the feed back of power therefrom to the main DC voltage supply will not occur so that the terminal voltage thereof will not be increased.

Obviously, many modifications and variations of the present invention are possible in light of the teachings of the present invention. Thus, although the invention has been explained by way of example with the employment of an auxiliary DC voltage supply for charging the commutating capacitors, it should be apparent that if desired the power supply 38 in FIG. 1 could be omitted. Under such conditions, the first thyristor 15 or 17, as the case may be, will be turned on after completion of a commutation to charge up the capacitor 31 or 35 from the DC voltage supply 14. The first thyristor will then be turned off before the beginning of the commutation due to the charging up of the capacitor. Moreover, it should be understood that the thyristor units in the arms may be formed with a plural number of thyristors connected in series or parallel in response to the circuit voltage level or current level. It is therefore to be understood that within the scope of the appended claims, the invention may be practiced otherwise than as specifically described herein.

What is claimed as new and desired to be secured by Letters Patent of the United States is:

1. An inverter device comprising:
   A DC voltage supply;
   two arms which are serially connected in the same conductive polarity across said DC voltage supply, each of said arms having serially connected first and second thyristor units, the second thyristor units being located at positions adjacent to a common connecting point of said two arms;
   a first commutating circuit which includes a commutating capacitor therein and which is connected in parallel with the second thyristor unit in one of said arms;
   a second commutating circuit which includes a commutating capacitor therein and which is connected in parallel with the second thyristor unit of the other arm of said two arm;
   a coupling transformer having a primary coil connected in said first commutating circuit and a secondary coil connected in said second commutating circuit for electromagnetically coupling the first commutating circuit with the second commutating circuit; and,
   wherein the second thyristor unit of one of said two arms will be selectively turned on when the other of said two arms is turned off and wherein the second thyristor unit in said other of said two arms will be selectively turned on when said one of said two arms is turned off.

2. An inverter device according to claim 1, wherein said serially connected first and second thyristor units in each of said two arms respectively includes a diode connected in opposite polarity and parallel thereacross, such that a current is caused to flow through the first thyristor unit of a give arm when the electric current flowing through the second thyristor of the same arm becomes zero and for developing a negative bias voltage across the respective second thyristor units.

3. An inverter device according to claim 1, wherein both the primary and secondary coils of said coupling transformer respectively include a diode connected thereacross for suppressing any oscillatory current which may pass through said first and second commutating circuits after the completion of every commutation between said two arms.

4. An inverter device according to claim 1, wherein is further included an auxiliary DC voltage supply for said first and second commutating circuits; and wherein said coupling transformer includes a tertiary coil for feeding back any oscillatory energy, which may exist in said commutating circuits, to said auxiliary DC voltage supply.

5. An inverter device according to claim 1, wherein the leakage inductance of said coupling transformer serves to function as the commutating inductance for said two arms.

6. An inverter device according to claim 1, which further comprises:
   an auxiliary DC voltage supply for said first and second commutating circuits; and,
   an auxiliary thyristor, said auxiliary thyristor being connected between said auxiliary DC voltage supply and said commutating capacitors such that the commutating capacitors are charged from said auxiliary DC voltage supply through said auxiliary thyristor; and,
   wherein said auxiliary thyristor is turned on after the completion of a commutation between said two arms to alternatively charge said commutating capacitors and is naturally turned off before the beginning of a commutation between said two arms.

* * * * *